2,876,108
Patented Mar. 3, 1959

2,876,108

PROCESSING OF FOOD MATERIALS

Welton I. Taylor, Chicago, and John H. Silliker, Park Forest, Ill., assignors to Swift & Company, Chicago, Ill., a corporation of Illinois No Drawing. Application November 3, 1955
Serial No. 544,842

11 Claims. (Cl. 99—150)

This invention is concerned with controlling the growth of bacteria in food products.

Historically, in the processing of foods, the processor has relied upon the expeditious handling of the product and proper temperatures to inhibit the growth of the objectionable bacteria. For example, in the drying of egg materials, the processor has employed pasteurization temperatures and speedy handling of the eggs when once shelled to control the growth of bacteria. Low temperature refrigeration is used in the storage of liquid egg materials and other perishable foods. These precautions and others have lessened the likelihood of food poisoning attributable to bacteria, but the problem still continues to plague the food industry.

The process of our invention makes available another method for inhibiting the growth of bacteria which in some instances may be used in conjunction with bacterial controlling processes now in use and in other instances, its practice alone will suffice. In its broad aspect, we propose to control an objectionable bacterium present in a food product by introducing a bacteriophage known to have growth inhibiting properties specific to the particular bacterium and maintaining the bacteriophage in contact with the bacterium for a sufficient time to substantially retard its growth.

The instant method may be readily incorporated in those food processes in which at some stage the food is in a liquid phase or in a sufficient moist condition (or in those food processes where, though the food is normally processed dry, it may be moistened without damage) to provide a medium through which the phage may move to attack the bacteria. Bacteriophages are known to be active throughout the incubation zone (generally 50°–125° F.) of bacteria and there is some indication that phages are active to some degree at temperatures somewhat outside the incubation zone.

Our process may be adapted to control bacterial growth during the curing of hams and in the manufacturing of domestic sausage. Hams are pumped with a curing brine and bacteriophage may be readily introduced to the meat through this liquid medium.

Our process may be beneficially employed to destroy objectionable bacteria either in the drying of egg materials or in egg materials held at low refrigerated temperatures. Preferably, the bacteriophage is introduced to the egg material after shelling and in the instance of drying, preferably two hours before the actual drying operation. In the case of refrigerated eggs, we prefer to add the bacteriophage to the material some hour or two before refrigeration.

Through the use of our process, selective killing of bacteria is possible. This makes possible the destruction of a particular harmful bacterium without the assistance of elevated temperatures which will destroy bacteria indiscriminately and possibly adversely affect flavor, texture, or other characteristic of the food product. Another advantage in the use of bacteriophages is their residual effect. Phages remaining after destruction of their respective host bacterium are available to forestall recontamination of the food.

For each genus of bacteria, such as Salmonella or coliform there are many species. It has been estimated that the number of identifiable Salmonella species are in excess of 140, and within a species, there are many strains. For classification purposes, the species of Salmonella have been broken down into 7 groups. For each strain of phage, there is a host species of Salmonella upon which it will thrive and, in some instances, there are "wide spectrum" strains of phages which will live off several species of Salmonella. The spectrum may be wide enough to encompass Salmonella species falling within different groups. We have obtained one strain of phages which is capable of living off some 97% of the known Salmonella species. In addition, we have isolated other phage strains of different spectra. The use of this extremely "wide spectrum" Salmonella phage in the processing, for example, of egg materials usually kills all of the Salmonella, but in order to assure the destruction of all possible species, other Salmonella phages may be used along with the "wide spectrum" phage to attack those species resistant to the latter phage.

The first step in the isolation of a desirable bacteriophage is the obtaining of an original source of the phage. Various sources are available such as raw sewage and its aerated sludge, raw water, milk, and pooled bacterial cultures. To a portion of the source material, there is introduced a 4-hour broth culture of the particular strain of bacterium which it is desired to kill in the food material. It will be seen that the adding of the particular bacterium strain to the sewage will encourage the growth of the bacteriophage which lives on it as a parasite. The sewage is held at 37° C. in an incubator throughout this period. After inoculating the sewage daily for a week or so, it is passed through a bacteria filter. The broth filtrate will contain the bacteriophage. The filter is of a size commonly available which permits the passage of the phages but not of the bacteria. The filtrate should have some of the desired phages providing, of course, some of that phage was originally present in the source material.

The broth filtrate is inoculated with a 4-hour broth culture containing the host bacterium upon which the desired phage lives, and the filtrate is incubated at 37° C. overnight. The next morning, the liquid is filtered again to remove any phage-resistant bacteria that may be present, that is, the bacteria which did not succumb to the attack of the phage. It will be readily seen if the phage-resistant bacteria were not removed, they would thrive on the broth culture introduced and in time reach an overwhelming number. The filtrate again is inoculated with the selected species of the bacterium for which it is desired to isolate a bacteriophage. Here, as before, the bacterium is introduced in a 4-hour broth culture. After the second introduction, the liquid will likely clear within a half-hour or so indicating an extremely high phage count and few residual bacteria. A clear liquid indicates the presence of phage and the absence of bacteria as the latter gives a cloudy appearance to the liquid. Some phage broth filtrate will only require two to three days to reach this state while others may take as long as two to three weeks. The phage filtrate so prepared may be preserved by refrigeration storage and need only be periodically fed bacteria for sustenance.

The particular phage which has been isolated as described above is fed various strains of bacteria to determine the width of its spectrum. As mentioned above, some strains of phage, for example, a Salmonella phage, may be capable of destroying several species of bacteria within the genus Salmonella, and even some species from closely related genera.

In the treatment of egg materials, for example, we propose to introduce to the egg materials strains of Salmonella phages with overlapping spectra to assure destruction of all of the Salmonella present. If it is wished to destroy other bacteria, suitable bacteriophages may be added along with the Salmonella phage.

In the processing of shelled egg materials and in particular the processing of yolks and the whole liquid eggs, the sugar present may or may not be removed. It is general practice in the processing of egg whites to remove the sugar. Three methods are commonly employed for desugaring, namely, bacterial fermentation, yeast fermentation and enzyme (deoxygenase) treatment. All three of these methods may be readily modified to permit the use of the bacteriophage-control process of this invention. Following desugaring, the egg materials are dried.

In one operation with which we are acquainted, egg yolks or the whole liquid eggs are passed through a strainer into large vats capable of holding approximately 8,000 lbs. These vats are supplied with cooling coils for lowering the temperature of the egg material to about 40° F. In some instances where the eggs are to be held for a longer period of time, the temperature is dropped to 32° F. The bacteriophage filtrate may be conveniently introduced to the egg materials in the vats and it is our recommendation that the bacteriophage be introduced at least 2 hours before the emptying of the vat to permit adequate time for the destruction of the bacteria. From the vat, the egg material is passed through a plate heat exchange wherein the temperature is raised to 140° F. Out of the heat exchanger, the egg material is sprayed through a high pressure nozzle into a spray dryer. Here, the material is dried by a counter-current stream of hot air, with the powdered egg material being collected at the base of the spray dryer.

If it should be that it is desired to desugar the egg yolks or the whole eggs, the deoxygenase and hydrogen peroxide are added in the above-described vats and the temperature of the egg material raised to 86° F. or so and held for a period of 3 to 4 hours, to bring about desugaring. Here again, bacteriophage filtrate may be introduced in the vat to destroy Salmonella or other objectionable bacteria. Following desugaring, the treated egg material is raised in temperature and spray dried. If the processor desires to pasteurize the egg material, it will be held within the range of 140 to 142° F. for 3 to 4 minutes in a heat exchanger before spraying. Elevated temperature for too long an interval will give an objectionable flavor to the egg material. Through practice of our invention, objectionable bacteria may be destroyed at a low temperature without endangering flavor. We contemplate the inactivation of the culture starter (bacteria) used in bacteriological fermentation following desugaring by the introduction of a selected bacteriophage parasitical to the culture.

Egg whites are dried in a manner different from the treatment of yolks and whole eggs. The large vat is filled with the albumen and heated to 100° F. at which temperature hydrogen peroxide and deoxygenase are added if that form of desugaring is being practiced. The egg whites are held at this temperature for approximately 10 hours to complete desugaring. In the practice of our invention, the bacteriophage may be added to the egg whites preferably in the vat two hours prior to the end of that holding period. Following the 10-hour holding period, the whites are cooled to within a range of 40-50° F. After cooling, the eggs are whipped into a foam, spread on a stainless steel conveyor and passed through a hot air oven held at the temperature of 200° F. The whites are in the oven for 35 minutes, and following the oven drying, are ground and packaged.

In the preceding description, we have spoken of the use of our process in conjunction with desugaring with deoxygenase. It is equally applicable to desugaring through bacterial fermentation or yeast fermentation.

Considerable egg material is preserved by freezing. Here, there is no drying and it is our recommendation that the bacteriophage filtrate be added to the shelled whole liquid egg or the albumen or the yolk being processed before freezing and preferably some hour or two before placement in the freezer.

We have found that the use of bacteriophage filtrate in the concentration of 2% on a volume base, that is, 2 parts of phage filtrate per 98 parts of liquid whole egg, yolk, or albumen is effective in controlling the objectionable bacteria. It is estimated that the strength of the phage filtrate is 20 billion particles (phages) per milliliter.

EXAMPLE I

In this experiment, the albumen was inoculated with *Salmonella chittagong* and divided into 3 aliquots. The *Salmonella chittagong* phage filtrate had been prepared as described above. The control aliquot received no phage. The second aliquot received 10% *Salmonella chittagong* phage on a volume basis. The third aliquot at this time was handled as the control. All were incubated for 2 hours at 37° C. The count on the control at the end of incubation showed 12,600 *Salmonella chittagong* per gram. Following incubation, the third aliquot had introduced to it a *Salmonella chittagong* phage filtrate in the amount of 10%. Thereafter, all three were whipped stiff and dried for 30 minutes in an oven at 165° F. After drying and reconstitution, the control had 23 Salmonella per gram; the second test lot, no Salmonella; and the other test lot which received phage after incubation had a count of 10 per gram. This experiment demonstrates the superiority of phage treatment over conventional pasteurization through oven drying and the increased efficiency obtained if a 2-hour incubation period is allowed before drying.

EXAMPLE II

In the work of this example, whole liquid eggs were inoculated with *Salmonella chittagong* in the amount of 10,000/gram. To an aliquot portion of the inoculated liquid eggs, *Salmonella chittagong* phage filtrate was added in the amount of 5% by volume. The other aliquot portion was not inoculated with the phage. The two portions were incubated at 37° C. for 3 hours and then frozen. After storage for 3 days in a frozen state, both aliquots were gradually thawed in a 120° F. water bath and bacterial counts made of the Salmonella populations. The control portion showed 9,860/gram as compared to 16/gram in the phage-treated portion.

EXAMPLE III

The work of this experiment was undertaken to determine the effectiveness of Salmonella phage in controlling the Salmonella bacteria in liquid albumen. The Salmonella phage filtrate used was prepared in the manner described above from raw sewage. To a test lot of albumen, the phage filtrate was incorporated at the level of 2% on a volume basis. An aliquot portion of the same albumen was used as a control. Immediately after introduction of the phage filtrate, a bacterial count was made and the control was found to contain Salmonella organisms in the amount of 86/gram, the test lot, 9/gram. At the end of one hour, the control had a count of 83 and the test lot 5, and at the end of 24 hours, the Salmonella in the control was too numerous to count and the test lot had the relatively low count of 269.

EXAMPLE IV

The work of this example was for the purpose of learning the relative effectiveness of various levels of phage filtrate. The albumen was divided into 7 aliquot portions, one of which was used for a control and to the other portions, Salmonella phage filtrate was added in the respective amounts of 20%, 10%, 5%, 2.5%, 0.5%, and 0.25% on a volume basis. The following table demonstrates the effectiveness of the several concentrations:

*Anti-Salmonella activity of bacteriophage in albumen*

|  | Hours | | | |
| --- | --- | --- | --- | --- |
|  | 0 | 1 | 2 | 4 |
|  | Salm./gram | Salm./gram | Salm./gram | Salm./gram |
| Control, no phage | 40 | 42 | 45 | 54 |
| 20% phage | 0 | 0 | 0 | 0 |
| 10% phage | 2 | 0 | 1 | 1 |
| 5% phage | 0 | 0 | 2 | 5 |
| 2.5% phage | 0 | 5 | 4 | 9 |
| 0.5% phage | 0 | 5 | 11 | 26 |
| 0.25% phage | 15 | 12 | 23 | 17 |

EXAMPLE V

In this example, a bacteriophage active against Streptococcus species (the fermentative organism used for the bacterial desugaring of albumen) was first isolated. A batch of liquid albumen was prepared. It was inoculated with the Streptococcus species and held for an adequate time to effect desugaring. The desugaring fermentation operation was carried on at a temperature in the neighborhood of 100° F. with the egg material being held for 10 hours. The desugared albumen was divided into 4 aliquot portions, and to two of these portions, the Streptococcus phage was introduced. The phage was permitted to act for four hours while the temperature of the albumen was gradually reduced to 40° F. When this temperature was reached, a control sample and a phage treated sample of the liquid albumen were frozen, while the other control and phage treated sample were subjected to conventional heat drying. The following table shows the advantages obtained by the use of phage in the two processes:

| Product and Process | Phage Treatment | After Fermentation | After Processing |
| --- | --- | --- | --- |
| 1. Albumen (Dried) | Treated | $33 \times 10^7$ | $18 \times 10^3$ |
| 2. Albumen (Dried) | Untreated | $31 \times 10^7$ | $23 \times 10^4$ |
| 3. Albumen (Frozen) | Treated | $38 \times 10^7$ | $32 \times 10^3$ |
| 4. Albumen (Frozen) | Untreated | $36 \times 10^7$ | $16 \times 10^4$ |

The results recorded in the above table show conclusively the advantages to be gained in the use of bacteriophage in the reduction of a specific bacterium population.

EXAMPLE VI

Seven strains of coliform bacteria were isolated. A specific bacteria phage active against each of the strains were isolated in a manner previously described from raw sewage.

A batch of liquid egg yolk was inoculated with 1000/gram coliform organisms of the seven strains, and divided into four aliquot portions. Two of the aliquots received 2.5% by volume of a filtrate of the seven phages and counts were made after two hours' incubation at 37° C. on desoxycholate plates. Two untreated portions were employed as controls. The controls showed a count of 763/gram at two hours and the phage treated, a count of 24/gram. One of the aliquots and one of the controls were subjected to conventional drying and subsequently found to have bacterial counts of <1/gram and 38/gram, respectively. The other two portions were held in a frozen state for 3 days and upon being subjected to a bacterial count, it was found that the phage treated sample had a count of 17/gram and the untreated portion 602/gram.

EXAMPLE VII

A potent bacteriophage for *Staphylococcus aureus* (*Micrococcus pyogenes*, var. *aureus*) was isolated in a manner previously decribed from raw sewage. Liquid albumen was inoculated with this bacterium in the amount of 1000/gram. The inoculated albumen was divided into four portions to two of which were added a bacteriophage filtrate at a level of 1.5% by volume. After four hours' incubation at 37° C., the controls had a count of 902/gram and the phage treated samples, a count of 12/gram. One of the phage treated samples and a control were frozen and held under refrigeration for 3 days. The two frozen samples were then thawed and a bacterial count run. The phage treated sample had a count of 7/gram and the untreated sample, a count of 824/gram. The other phage treated sample and its control were subjected to conventional drying. Upon the completion of drying, the phage-treated sample was found to have a bacterial count of 2/gram and its control 86/gram.

EXAMPLE VIII

A collection of Paracolobactrum species consisting of known Bethesda, Arizona, and Ballerup strains was employed to isolate phages active against these groups.

A batch of liquid egg yolk was inoculated with 100/gram of the three Paracolobactrum strains. An aliquot portion was inoculated with 2.5% by volume of the bacteriophage mixture which consisted of three phages with overlapping spectra, and incubated for two hours at 37° C. If desired, at least two of the Paracolobactrum strains and phages may be employed. The phage treated sample and a control were frozen and subsequently thawed after 18 hours. The control averaged 72/gram while the phage treated sample averaged 2/gram.

EXAMPLE IX

Albumen was inoculated with a $1 \times 10^7$/gram Streptococcus species (an egg fermentative organism), 100/gram Paracolobactrum, 3 types, 100/gram *Straphylococcus aureus*, two strains and 7 strains ($1 \times 10_3$/gram) of coliform. Fermentation at 37° C. proceeded for approximately 7 hours at which time to an aliquot portion 5% by volume of phage mixture containing Salmonella, Paracolobactrum Staphylococcus, and coliform bacteriophages, and a specific phage for the Streptococcus fermentative organism were added. In the 3–4 hours required to lower the temperature to 4° C. the bacteriophages exert their activity and the following counts as to a control and the phage treated portion were obtained before and after drying:

| Treatment | Type of Count | Before Fermentation | After Fermentation | After Drying |
| --- | --- | --- | --- | --- |
| Control | Coliform | $3.6 \times 10^3$ | $4.2 \times 10^5$ | $3.8 \times 10^5$ |
| Phage | do | $3.9 \times 10^3$ | $5.1 \times 10^5$ | 604/g. |
| Control | Staphylococcus | 82/g. | $4.89 \times 10^5$ | $4.6 \times 10^5$ |
| Phage | do | 87/g. | $5.63 \times 10^5$ | 490/g. |
| Control | Salmonella-Paracolobactrum | 176/g. | $7.86 \times 10^5$ | $2.21 \times 10^5$ |
| Phage | Salmonella-Paracolobactrum | 163/g. | $4.12 \times 10^5$ | 71/g. |
| Control | Total count [1] | $22 \times 10^7$ | $38 \times 10^8$ | $17 \times 10^7$ |
| Phage | do [1] | $18 \times 10^7$ | $31 \times 10^8$ | $9.2 \times 10^3$ |

[1] This includes Streptococcus.

In studying the above table, it should be remembered that the dried egg albumen has 8 times the amount of solid as the liquid product has before drying. As will be seen in the above table, several individual bacterial counts were run on both the control and the phage treated sample.

We prefer to hold the bacteriophage in contact with the egg material for a period of time prior to subjecting the material to further processing. In the instance where the egg material is to be subsequently dried, we recommend that the bacteriophage inoculated eggs be held for 2 hours or thereabouts, although as shown by Example 1, it is possible to obtain some benefit of the invention even though the egg material be further processed without delay after introduction of the bacteriophage. The egg material is preferably subjected to a preservation step after inoculation with the bacteriophage, primarily to place the egg material in a form which is less likely to be recontaminated. Among the preservation steps that may be employed are freezing, drying, canning and similar operations.

In the manufacture of domestic sausage, if there should be a relaxation in the precautions normally followed, a bacterial hazard could arise. If, for example, Staphylococci, capable of producing gastrointestinal irritation, are permitted to reproduce to the extent of a few million cells per gram of meat, they may be expected to manufacture detectable amounts of toxin which, unlike the bacteria itself, is relatively heat stable to the subsequent cooking operation. Likewise, in the curing of hams, if the meat following the pickling state should be held for a few hours at a temperature within the incubation zone of bacteria (room temperature falls within this zone) prior to smoking, the bacteria may develop in number to an extent where it may become dangerous. Even though the hams are moved without delay from the pickling room (which is at a temperature below the incubation zone) to the smoke house, if there should be an undercook in the smoking operation, here again, there will be an opportunity for the bacteria to multiply. The examples below are illustrative of the advantages to be gained in the practice of our process in connection with the manufacture of meat products:

EXAMPLE X

Chunk meat along with ice amounting to 15% of the weight of the meat, conventional spices and curing salt were chopped to form an emulsion of the meat and water. At this point, the emulsion was inoculated with 500,000 *Staphylococcus aureus*/gram of meat and the emulsion thoroughly mixed to disperse the bacterium throughout. The emulsion was subdivided and to half of it, a broth filtrate of a bacteriophage parasitical to the *Staphylococcus aureus* was introduced to the meat. The broth filtrate constituted 5% of the meat based on the weight of the meat. The control batch of the emulsion received no phage treatment. The control and phage treated portion of the emulsion were then separately transferred to vacuum mixers where the air was drawn off. The two batches were then stuffed in suitable casings. After a 2-hour time lapse from mixing, counts were taken as tabulated in the table below. The stuffed sausages were then heated in a smoke house followed by a short interval of cooking in a cooker of the type conventionally employed in the manufacture of domestic sausage. At the conclusion of the heating operation, counts were taken again and the product was then subsequently cooled, sliced and packaged.

*Staphylococcus aureus counts observed*

|  | Ground Meat | Stuffed Uncooked | Cooked |
|---|---|---|---|
| Controls w/o phage | 500,000/gm | $2.2 \times 10^7$/gm | 0/gm. |
| Phage treated | 500,000/gm | $1.2 \times 10^4$/gm | 0/gm. |

The above table demonstrates the bacteriological control available through practice of our process through inoculation with a phage specific to the undesirable *Staphylococcus flora*. The end product is Staphylococcus free whether or not bacteriophage is added; this results from the cooking. However, the importance of our process is demonstrated in the counts obtained after stuffing and before the heating operation. In the manufacture of a domestic sausage, refrigeration prevents an appreciable increase of bacterial numbers before the preparation of the emulsion, but as demonstrated in the instant experiment, where there is an appreciable delay prior to the heating operation and for that matter, prior to reaching a temperature deleterious to further growth of the bacteria in the cooking process, the bacterial count may increase to the point where Staphylococcus begins to produce toxin. The toxin produced as mentioned before is relatively heat stable and may survive the cooking stage, in which event the sausage could be harmful to man even though the bacterium producing it has been destroyed.

EXAMPLE XI

Two uncured hams received an inoculum of approximately 10,000 *Staphylococcus aureus*/gram of meat through incorporation of a suitable culture in conventional pickling solutions. In the first ham, this was accomplished by adding the bacterium culture to the pumping pickle and pumping to a 5% weight increase. To another portion of this same pickling solution, *Staphylococcus aureus* phage was introduced in a broth filtrate in an amount constituting 5% based on the weight of the meat and the ham further pumped with this phage containing pickling solution for an additional 10% gain in weight. The control ham which was not phage treated was pumped with a *Staphylococcus aureus* inoculated pickling solution to a 15% weight increase. The hams were then placed in a cover pickling solution and held for 13 days at 40° F. The two hams were then removed from the cover pickling solution, washed and counts made for Staphylococcus. These counts are shown in the table below and it will be noted that they were substantially the same as the original inoculated meat. The hams then went to smoking and received a deliberate undercooking. Counts were made at chilling before packaging and the untreated ham evidenced sufficient Staphylococcus for toxin production while the phage treated ham did not.

*Staphylococcal counts*

|  | After over pickle | After smoke |
|---|---|---|
| Control | 11,400 | 13,000,000 |
| Test | 11,200 | 1,080 |

Obviously, many modifications and variations of the invention as hereinbefore set forth may be made without departing from the spirit and scope thereof, and therefore only such limitations should be imposed as are indicated in the appended claims.

We claim:

1. A method of controlling bacterial growth in a food material which comprises adding to the food material containing an objectionable bacterium a bacteriophage having predetermined properties of destroying said bacterium and maintaining said phage in contact with said bacterium under suitable conditions whereby said bacterium are substantially reduced.

2. In the processing of a food product, a method of treating to destroy Paracolobactrum which comprises introducing to the food product at least 2 strains of Paracolobactrum phages having overlapping and varying spectra, and holding said phages under conditions adequate to substantially destroy the Paracolobactrum.

3. In the processing of a food product, a method of treating to destroy at least two types of bacteria which comprises introducing to the food product strains of phages having predetermined properties of destroying said types of bacteria and maintaining said phages in contact with said bacteria under conditions whereby said bacteria are substantially reduced.

4. A method of controlling the growth of a bacterium in food products which comprises obtaining an original source believed to contain a bacteriophage which lives on said bacterium as a parasite, alternately inoculating said source with a culture of said bacterium and incubating the inoculated source, said incubating being at a temperature inducive to the growth of the bacteriophage in the presence of said bacterium, filtering the source to separate the bacteriophage in the filtrate, introducing to the filtrate said bacterium to build up the concentration of the bacteriophage, thereafter introducing at least a portion of the bacteriophage so isolated to a food product containing said bacterium and maintaining said phage in contact with bacterium under suitable conditions whereby said bacterium are substantially destroyed.

5. In the processing of egg materials, a method of treating to destroy an objectionable bacterium which comprises introducing to the egg material prior to drying a bacteriophage that lives on said bacterium in an amount effective to substantially destroy the bacterium, holding the egg material for a period of time at a temperature within the bacterium incubation zone to bring about the substantial destruction of the bacterium by the bacteriophage, and thereafter drying the egg material.

6. In the processing of egg materials, a method of treating to destroy an objectionable bacterium which comprises introducing to the egg material a bacteriophage that lives on said bacterium, holding for a period of time at a temperature within the bacterium incubation zone to permit destruction of the bacterium by the said phage, and thereafter freezing the egg material.

7. In the processing of egg materials, a method of treating to destroy a Salmonella bacterium which comprises introducing to the egg material prior to drying a Salmonella phage that lives on said Salmonella, holding for a period of time at a temperature within the Salmonella incubation zone to permit the substantial destruction of the Salmonella by the Salmonella phage, and thereafter drying the egg material.

8. In the processing of egg materials, a method of treating to destroy a Salmonella bacterium which comprises introducing to the egg material a Salmonella phage that is parasitical to said Salmonella, holding for a period of time at a temperature within the bacterium incubation zone to permit substantial destruction of the Salmonella by the Salmonella phage, and thereafter freezing the egg material.

9. In the processing of a meat, a method of treating to control an objectionable bacterium which comprises introducing to the meat an isolated phage having predetermined properties of destroying said bacterium and maintaining said phage in contact with said bacterium under conditions whereby said bacterium is substantially reduced.

10. In the processing of a ham, a method of treating to control an objectionable bacterium which comprises pumping the ham with a liquid containing a phage that lives on said bacterium and maintaining said phage in contact with said bacterium under conditions whereby said bacterium is substantially reduced.

11. In the manufacture of a domestic sausage, a method of treating to destroy an objectionable bacterium which comprises forming an emulsion of the meat and water with a bacteriophage dispersed throughout, said bacteriophage predetermined to have properties of destroying said bacterium and maintaining said phage in contact with said bacterium under conditions whereby said bacterium is substantially destroyed.

References Cited in the file of this patent

FOREIGN PATENTS 734,520   Great Britain _____ Aug. 3, 1955

OTHER REFERENCES

"The Microbiology of Foods," 1944, by F. W. Tanner, second edition, publ. by Garrard Press, Champaign, Illinois; p. 461, article entitled "Bacteriophage in Dairy Starters," and p. 508, article entitled "Bacteriophage in Cheese Making."

"Bacteriology and Allied Subjects," 1945, by Louis Gershenfeld, publ. by Mack Publishing Company, Easton, Pa., pp. 342 and 343, article entitled "Phagotherapy."